W. H. ALLEN.
EMERGENCY STOPPING DEVICE FOR CARS.
APPLICATION FILED MAR. 23, 1910.
984,341.
Patented Feb. 14, 1911.
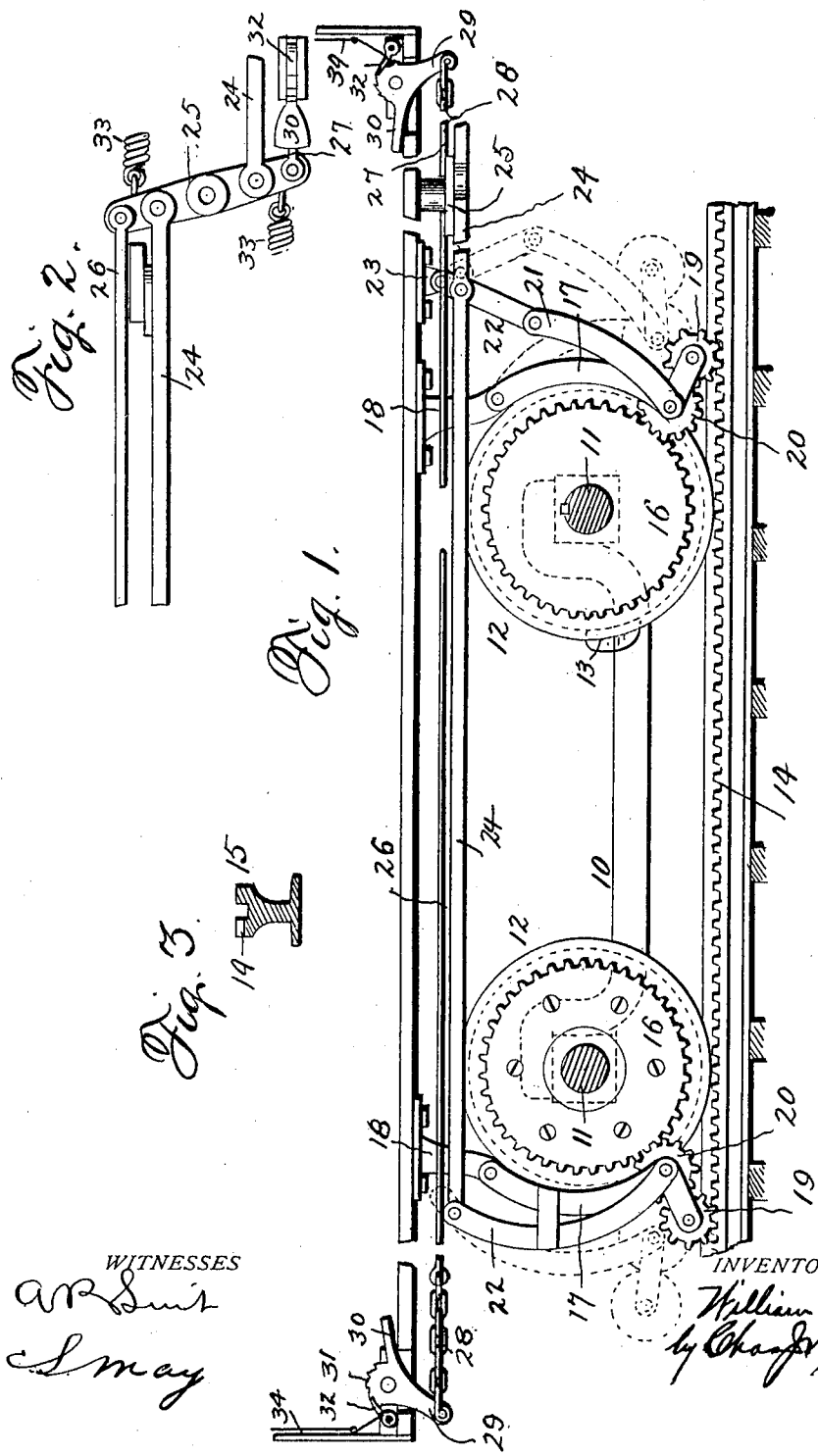
WITNESSES
INVENTOR
William H. Allen
by Chas. J. Williamson
Attorney

UNITED STATES PATENT OFFICE.

WILLIAM H. ALLEN, OF LONG ISLAND CITY, NEW YORK.

EMERGENCY STOPPING DEVICE FOR CARS.

984,341.      Specification of Letters Patent.      Patented Feb. 14, 1911.

Application filed March 23, 1910. Serial No. 551,192.

*To all whom it may concern:*

Be it known that I, WILLIAM H. ALLEN, of Long Island City, in the county of Queens and in the State of New York, have invented a certain new and useful Improvement in Emergency Stopping Devices for Cars, and do hereby declare that the following is a full, clear, and exact description thereof.
Provided with an ordinary brake equipment, a car—for example, a trolley car— especially when the rails are slippery, can be stopped with difficulty within any reasonable limit when the brakes are applied with the car running at its normal speed, because of the locking of the wheels by the brake shoes, which results in the sliding or skidding of the wheels on the rails. Under slippery conditions, with the ordinary equipment, the procedure is to release the brakes when the wheels are locked to allow the wheels to rotate, and then again apply the brakes, these operations being repeated until the car has been brought to a stop.
On greasy rails, the stop may be made in one hundred feet, or possibly two hundred feet or more may be required, the distance within which the stop is effected being a matter due in part to luck or chance and the judgment of the motorman. At times there are emergencies requiring practically instantaneous stoppage of the car when running at full speed.

The object of my invention is to render possible the prompt stoppage of a car when running at full speed, so that if necessary the stop may be made in a few feet, as, for example, six feet, regardless of the condition of the rails, and to do this without any alteration in the ordinary brake equipment of the car, and to these ends and others, also of importance, hereinafter mentioned, my invention consists in the mechanism constructed substantially as hereinafter specified and claimed.

In the accompanying drawings, Figure 1 is a side elevation of a car truck and enough of the car to illustrate an embodiment of my invention, the full lines showing the positions of the parts for stopping the car and the dotted lines showing the positions of the parts under normal running conditions. Fig. 2 a detail view of portion of the operating device; and Fig. 3 a cross section of a track rail which I may use.

To illustrate an embodiment of my invention, I show in the drawings a car truck and a portion of a car, 10 denoting the truck frame 11, two axles mounted at opposite ends of the frame, and 12 one of the wheels on each of the axles. A brake shoe 13 of an ordinary brake mechanism is shown for each wheel.

A fundamental idea or characteristic of my invention is the prevention of the stoppage of the revolution of the car wheels so long as the onward movement of the car continues, and in effectuating this idea, I provide means for compelling the rotation of the car wheels so long as any onward movement of a car continues.

As shown in the drawing as an embodiment of my invention, I gear the car wheels with a rack bar 14, which preferably is applied at one side of one of the track rails 15, the side being that opposite the wheel tread-engaging surface of the rail. Rotatably connected with the car wheel 12, either by being bolted to the side of the wheel, or by being keyed to the wheel axle, is a spur gear 16. Mounted on a swinging frame 17, hung at its top to a bracket or hanger 18 bolted to the bottom of the car, is a train composed of two intermeshing spur gears 19 and 20, which by the swinging of the frame may, respectively, be moved into and out of mesh with the rack bar 14 and the gear 16. It will be seen that when the gear 19 is in mesh with the rack bar 14, onward movement of the car through the gears 19, 20 and 16 will compel the car wheel to rotate and thus prevent any sliding or skidding of the wheel on the rail, so that with the brake shoe applied to the car wheel, the friction of wheel and shoe will result in stopping the rotation of the wheel, and effect the stopping of the car. It will be understood that when the frame 17 is moved to place the gear 19 into mesh with the rack bar 14, the brakes are applied in the usual way.

Pivotally connected at one end to the swinging frame 17 is a link 21, which at its other end is pivotally connected to a rocking arm or lever 22 hung to a bracket or hanger 23 bolted to the floor of the car, and connected to the arm or lever 22 is a link 24 in the form of a bar long enough to reach from the lever 22 for the wheel-controlling mechanism at one end of the truck to the similar lever 22 of the wheel-controlling mechanism at the other end of the truck, and which link 24 is connected to a lever 25 pivoted intermediate its ends to a suitable support on the car frame. From one end of the lever or beam 25, a rod 26 runs toward one end of the car, and from the other end of said lever or beam 25, a rod 27 runs to the other end of the car, and each rod is connected by a short chain 28 to an arm 29 of a treadle 30 pivoted to the respective platforms of the car. Thus, by depressing the treadle 30 at either end of the car, the beam 25 will be rocked in the direction required to throw the gears 19 and 20 into mesh with the rack bar 14 and the wheel 16, and in order to lock the gears in this position the treadle 30 has a ratchet tooth sector 31 with which a locking dog or pawl 32 engages. When the pawl 32 is released or disengaged from the ratchet tooth of the treadle, the gears 19 and 20 may be moved out of their meshing position, and to produce such movement, I preferably employ one or more coil springs 33 that are attached at one end to the beam 25, and at the other end to the floor of the car. A convenient means for lifting the dog 32 out of engagement with the ratchet teeth of the treadle, may consist of a wire or cord 34 which at one end is attached to the pawl, and at the other end is attached to the air handle, so that simultaneously with the release of the brakes by the operation of the air handle, the disengagement of the gears 19 and 20 from the rack bar 14 and the wheel 16 will take place.

Among the other advantages and uses of my invention are the avoidance of flat wheels due to sliding or skidding; the prevention of spinning of the wheels on slippery rails or running away of the motor when starting the car, and avoiding the necessity for the use of sand on the rails; and as aiding the propulsion of the car through snow drifts.

The rack bar may be separately made and bolted, or otherwise fastened to the ordinary rail, or the rails when originally made at the rolling mill may have the teeth formed therein.

It will be seen that the mechanism that is required to carry my invention into practice is extremely simple, and its operation is easily performed.

It will be understood that other forms of parts and devices than those illustrated and described herein may be utilized for the embodiment of my invention, and I therefore do not restrict the scope of my protection to the particular construction and arrangement of parts herein shown and described; nor do I restrict myself to the application of my invention to any particular type of car.

In the construction shown in the drawings, a rack bar is used alongside each rail, but, of course, this is not necessary, for by placing the swinging gears 19 and 20 on the same side of both trucks, a single rack bar may be used. Where there are two trucks, the operating lever 22 and the rods 21 will be duplicated and one set or system operated from one end of the car by a treadle and the other system or set from the other end of the car, so as to provide for turning the car around.

In some cases, in order to use a single rack bar, the swinging gears 19 and 20 may be duplicated on both sides, so that in whichever direction the car is turned, it will have a set of gears to mesh with said rack. Of course, in such case, one set of the gears would be idle, though lowered.

What I claim is—

1. As an improvement in car-controlling mechanism, the combination of a car wheel, a brake device therefor, and means for gearing said wheel with a rack on the road bed to rotate said wheel.

2. As an improvement in car-controlling mechanism, the combination of a car wheel, a brake device therefor, and means for gearing said wheel with a rack on the road bed to rotate said wheel, and such a rack.

3. As an improvement in car-controlling mechanism, the combination of a rail-engaging car wheel, a brake device therefor, a movably supported gear wheel, and means to connect said gear wheel and said car wheel, and said gear wheel and a stationary rack acting to rotate said gear wheel.

4. In a car-controlling mechanism, the combination of a car-driving and supporting wheel, a brake device therefor, a rack bar on the road bed, a gear movably mounted so as to be movable into and out of mesh with said rack bar, and means for connecting said gear with said wheel, said rack bar when in mesh with the gear wheel acting to revolve said wheel.

5. As an improvement in car-controlling means, the combination of a car wheel, a brake device therefor, a rack mounted on the road bed, a gear wheel movable into and out of mesh with said rack, means to connect said gear wheel and said car wheel, a treadle, and connections between said treadle and said movable gear, said rack bar when in mesh with the gear wheel acting to revolve said wheel.

6. As an improvement in car-controlling mechanism, the combination of a truck having wheels at opposite ends, a brake device for each wheel, a rack bar mounted on the road bed, gearing adapted to connect each wheel and said rack bar, a swinging frame supporting said gearing, a connection between said swinging frame whereby they may be simultaneously moved, and an operating mechanism acting on said connection.

In testimony that I claim the foregoing I have hereunto set my hand February 21st, 1910.

WILLIAM H. ALLEN.

Witnesses:
ANTHONY M. MONA,
HARRY F. SILL.